United States Patent [19]
Davis et al.

[11] Patent Number: 5,632,867
[45] Date of Patent: May 27, 1997

[54] RECOVERING A RELATIVELY VOLATILE COMPONENT OF A SOLUTION FROM A LESS VOLATILE COMPONENT, E.G. AS IN SOLVENT RECOVERY

[75] Inventors: Michael B. Davis, Morristown, N.J.; John J. Dugan, Sarnia, Canada; James D. Eagan, Woking, England; Adrianus Welmers, Mendham, N.J.

[73] Assignee: Exxon Research and Engineering Company, Florham Park, N.J.

[21] Appl. No.: 325,456

[22] PCT Filed: May 18, 1993

[86] PCT No.: PCT/US93/04724

§ 371 Date: Feb. 27, 1995

§ 102(e) Date: Feb. 27, 1995

[87] PCT Pub. No.: WO93/23131

PCT Pub. Date: Nov. 25, 1993

[30] Foreign Application Priority Data

May 19, 1992 [GB] United Kingdom .................. 9210620

[51] Int. Cl.[6] ................................................... B01D 3/00
[52] U.S. Cl. .................. 203/78; 196/14.52; 196/99; 202/152; 202/176; 202/168; 203/80; 203/DIG. 9; 208/87; 208/100; 208/347
[58] Field of Search ..................... 203/78, 80, DIG. 9, 203/100, 49, 40; 196/14.52, 99; 202/161, 176, 168, 197, 152; 159/DIG. 10, 27.2, 46, 16.1, 47.1, 901; 208/87, 100, 347, 102–105, 311

[56] References Cited

U.S. PATENT DOCUMENTS

| | | | |
|---|---|---|---|
| Re. 16,267 | 2/1926 | Stevens | 203/98 |
| 1,489,009 | 4/1924 | Rohmer et al. | 203/98 |
| 1,870,854 | 8/1932 | Lewis | 203/18 |
| 2,405,393 | 8/1946 | Atkins, Jr. | 203/98 |
| 3,622,127 | 11/1971 | Burke, Jr. | 159/DIG. 10 |
| 3,974,023 | 8/1976 | Bowers | 159/DIG. 10 |
| 4,874,475 | 10/1989 | McLaughlin et al. | 203/98 |
| 5,089,235 | 2/1992 | Schwartz et al. | 208/48 Q |
| 5,209,821 | 5/1993 | Shaw et al. | 159/48.1 |
| 5,248,408 | 9/1993 | Owen | 208/113 |
| 5,462,643 | 10/1995 | Miess et al. | 159/DIG. 10 |

FOREIGN PATENT DOCUMENTS

| | | | |
|---|---|---|---|
| 0080808 | 6/1983 | European Pat. Off. | |
| 1305938 | 12/1962 | France | |
| 1091681 | 10/1960 | Germany | |
| 0666499 | 2/1952 | United Kingdom | |
| 0958596 | 5/1964 | United Kingdom | 202/173 |
| 1183087 | 3/1970 | United Kingdom | 202/161 |

*Primary Examiner*—Virginia Manoharan
*Attorney, Agent, or Firm*—Joseph J. Allocca; James H. Takemoto

[57] ABSTRACT

In a solvent recovery plant including a recovery or distillation tower from which solvent product is recovered overhead, an isothermal separator, preferably a cyclone, is used to separate liquid phase contaminant (i.e. oil in a lubricating oil extraction process) in overhead product and to feed the separated liquid to the recovery tower as reflux. In addition, a portion of the feed to the tower can be branched off and mixed with the overhead product to bring its temperature down to close to the dew point of the solvent vapor. In this way, flooding of the uppermost tower trays and distillation of oil overhead can be overcome.

5 Claims, 1 Drawing Sheet

RECOVERING A RELATIVELY VOLATILE COMPONENT OF A SOLUTION FROM A LESS VOLATILE COMPONENT, E.G. AS IN SOLVENT RECOVERY

This invention, in its broadest sense, relates to apparatus and a method for recovering a relatively volatile component of a solution from a less volatile component of the solution. However, it finds particular application to recovering solvent from the extract solution from a solvent extraction process.

Solvent extraction processes are very well known, for example in the oil industry. Examples of solvent extraction methods are lubricating oil extraction, de-asphalting and lubricating oil de-waxing processes. Usually, economics dictate that the solvent used in the solvent extraction process be recovered and recycled for re-use in the extraction process.

Numerous techniques are known for recovering the solvent from the extract solution. Typically, the extract solution is passed through a separator, for example a recovery tower, in which the solvent is recovered from the extract product. However, due to inevitable separation inefficiency and carryover within the separator, the recovered solvent contains residual amounts of the extract product. Usually, because of the presence of these residual amounts of the extract product in the recovered solvent, this solvent cannot merely be recycled to the solvent extraction plant; rather, measures have to be taken to remove as much of the residual extract product as possible beforehand. Furthermore, trace quantities remaining after as much residual extract product as possible has been removed effectively reduces the capacity of the solvent extraction plant.

Examples of solvent recovery processes of background interest to the present invention are disclosed in U.S. Pat. No. 4,482,453 (Coombs et al), U.S. Pat. No. 4,664,783 (Preusser et al) and U.S. Pat. No. 4,997,547 (Emmrich et al).

In a typical lubricating oil extraction process, a distillation feed, comprising a fraction boiling in the lubricating oil range from a vacuum distillation tower, and solvent are separately fed to a solvent extraction tower, from which raffinate, i.e. lubricating oil and wax, is produced as overhead and extract solution (i.e. a solution of aromatics in solvent) is produced as bottoms. One form of plant known to the Applicants for recovering the solvent from the extract solution from a lubricating oil extraction plant will be described in more detail hereinbelow with reference to FIG. 1. Essentially, however, this plant comprises a recovery tower to which the solvent extract is fed, via a pre-heater, so that most of the solvent is vaporised as it enters the tower, the remainder vaporising within the tower. The tower is a conventional distillation tower provided with trays which are often refluxed with solvent or part of the solvent/solute mixture. The ascending vapor is contacted with descending cooler liquid, for example branched off from the solvent extract feed before it is pro-heated, together with any reflux liquid. In order to improve the solvent recovery, residual quantities of solvent in the liquid bottoms product from the recovery tower can be removed in a stripper and, together with strip gas, introduced into the recovery tower. Solvent vapor produced overhead from the recovery tower is passed, along an overhead line, to a condenser, in which the solvent vapor is condensed to form liquid solvent which can then be recycled for re-use in the lubricating oil extraction plant. A small amount of solvent vapor may condense to form liquid solvent in the overhead line.

There are three main problems with existing solvent recovery facilities such as exemplified above in a lubricating oil extraction plant. Firstly, the solvent/feed ratios needed for such processes are typically large and this in turn often results in flooding limitations in the recovery tower. Thus, the plant capacity cannot be increased unless the tower is replaced with a larger one. Such tower replacements are undesirable because of their high cost. Secondly, high vapor velocities or flooding can result in oil entrainment from the recovery tower and oil contamination of the solvent recovered overhead. Thus, the treat ratio of solvent-to-feed must be increased to obtain the desired solvent product quality. Energy costs to recover the additional solvent are correspondingly higher. The oily solvent also can produce a poorer quality and lower yield of the desired solvent product. Lastly, low efficiency of the recovery tower trays results in high temperatures of the solvent vapors (superheated solvent vapor) leaving the top of the tower. These high temperatures can cause large amounts of oil to be distilled overhead, thus worsening the contamination of the solvent product. Additionally, high vapor temperatures also aggravate any solvent condensing capacity limitations on the condenser used to condense the overhead solvent vapor product from the recovery tower. In general, the closer together the boiling points are of the components of the recovery tower feed, the greater the carryover of extract product into the overhead product.

The contamination of the solvent product resulting from the effects mentioned above is very undesirable. For example, if the oil content of the recycled solvent is 3% by volume, typically this would contribute around 15% to the loading on the plant capacity of the solvent extraction plant. The contaminating oil, typically occupying 3% by volume of the recycled solvent, causes the overhead vapor to appear as a foamy material.

According to the invention from one aspect, there is provided an apparatus for recovering a relatively volatile component of a solution from one (or more) less volatile component(s) of the solution, comprising a recovery tower for recovering the majority of the less volatile component as a liquid bottoms product and for recovering the more volatile component in an overhead product comprising gaseous phase of the more volatile component and a residual amount of liquid phase of the less volatile component, an isothermal separator for separating the residual amount of liquid phase (and any other liquid present) from the overhead product, and means for returning the separated liquid from the separator as liquid reflux to the recovery tower.

According to the invention from another aspect, there is provided a method of recovering a relatively volatile component of a solution from one (or more) less volatile component(s) of the solution, comprising the steps of:

(a) feeding the solution to a recovery tower in which the solution ascends mainly in vaporized form;

(b) contacting the hot ascending vapour with cooler descending liquid under conditions in the recovery tower such that the majority of the less volatile component is recovered as a liquid bottoms product and the more volatile component is recovered overhead in an overhead product comprising gaseous phase of the more volatile component and a residual amount of liquid phase of the less volatile component;

(c) separating the residual amount of liquid phase of the less volatile component (and any other liquid present) from the gaseous phase of the more volatile component in an isothermal separation process, so that substantially no liquid remains in the overhead product; and (d) returning said separated liquid to the recovery tower as reflux.

Thus, the isothermal separator, separates the less volatile component, i.e. the oil in the case of processing the extract solution from a lubricating oil extraction process, from the more volatile solvent, which can then be condensed and recycled to the solvent extraction plant. Furthermore, the separated oil, together with the small quantity of liquid solvent separated from the vaporised solvent, is used as reflux to the recovery tower, so that the oil can be separated-out in the bottoms product and the liquid solvent re-vaporised in the recovery tower and recovered as overhead vapor product.

In this way, the foamy overhead product is separated into its respective liquid and vapor phases by the isothermal separator. A cyclone is a particularly simple and effective piece of equipment for this purpose.

In a preferred embodiment, a portion of the extract solution feed to the recovery tower is branched off before the feed is pre-heated prior to introduction into the recovery tower and the branched off portion is mixed with the recovery tower overhead product passing to the isothermal separator. The temperature (e.g. 150° C.) of the branched off portion is below that (e.g. 290° C.) of the overhead product, so as to reduce the temperature of the overhead product to, or just above, the dew point of the solvent, to desuperheat the overhead product and thereby substantially eliminate the overhead distillation of oil and condenser overloading. In addition, tray flooding is reduced or eliminated, partly because the recovery tower can be operated at a higher temperature and partly because the branched off portion of the recovery tower feed bypasses the tower.

Residual quantities of solvent in the bottoms product can be recovered in the conventional manner using a stripping tower. Preferably, the overhead recovered solvent and strip gas from the stripping tower, instead of being introduced into the recovery tower in its lower region as would be conventional when using a stripping tower, is mixed with the overhead product passing from the recovery tower to the isothermal separator. This contributes to alleviating the loading on the upper trays in the recovery tower. Again, the operating conditions within the solvent recovery plant would be set such that the temperature of the overhead product passing to the isothermal separator is at, or just above, the dew point of the solvent vapour.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Although the description which now follows relates to the recovery of solvent from the extract solution from a lubricating oil extraction process, the invention is also applicable to recovering the solvent used in other types of solvent extraction processes (e.g. solvent de-waxing of lubricating oil and de-asphalting), and even, in its broadest sense, to recovering a more volatile component of a solution from a less volatile component of that solution.

Figure 1:
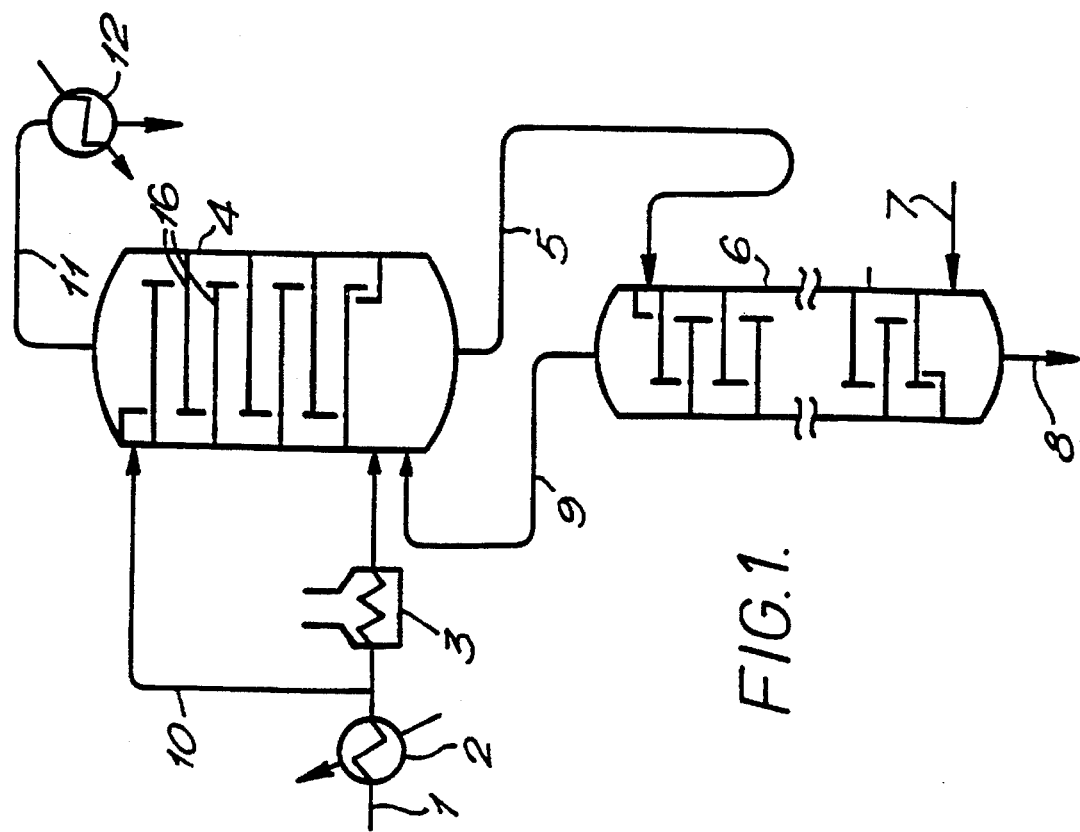
FIG. 1 is a schematic view of one form of solvent recovery plant, which is known to the Applicants for recovering solvent from a lubricating oil extraction process and which does not constitute an embodiment of the invention.

Referring to FIG. 1, in the solvent recovery plant known to the Applicants, extract solution in recovery tower feedline 1 (this solution comprising typically 75 to 80 volume % extraction solvent, for example N-methyl-pyrrolidone, the balance being aromatic extract material from the treater tower of the extraction plant (both not shown)) is preheated in heat exchanger 2 and furnace 3. Most of the solvent in the extract solution is vaporised as it leaves furnace 3, the mixture passing into recovery (rectification) tower 4, which includes conventional rectification trays 16 for providing vapor-liquid contact between the ascending vapors in the rectification tower 4 and the descending, cooler, liquid. The liquid portion of the mixture fed into the recovery tower through feedline 1, together with descending liquid from the upper region of the tower collecting at the tower bottom, exits the tower 4 through line 5 as liquid bottoms product.

Because of the inevitable imperfect separation between solvent and aromatics in recovery tower 4, the liquid bottoms product contains residual amounts of solvent. In order to recover substantially all of this remaining solvent, the bottoms product is passed to the top of stripping tower 6 which is equipped with stripping trays and to the bottom of which stripping gas, for example nitrogen or any suitable low-boiling temperature gas, is supplied through line 7 to vaporise the residual solvent. The stripped extract product leaves stripping tower 6 through line 8. The solvent vaporised in tower 6, together with the stripping gas supplied through line 7, leaves the top of stripping tower 6 through overhead line 9 and enter rectification tower 4 close to the entry point for the feed mixture from furnace 3. The vapors mix within the tower and pass upwardly. On the trays 16 within the rectification tower 4, the ascending vapors are contacted by cooler descending liquid extract solution introduced into the upper part of the tower 4, above the top tray, through line 10 branched off from a location in feedline 1 upstream of the furnace 3. Vapor leaving the top of tower 4 through line 11 is condensed in condenser 12, to form liquid product which is recycled to the solvent extraction plant (not shown). The strip gas passing through overhead line 11 into condenser 12 can be recycled to feed line 7. As already described, liquid leaving the bottom-most tray of tower 4 combines, in the bottom of the recovery tower, with the liquid portion of the mixture entering tower 4 from feedline 1.

Contacting efficiencies between the liquid and vapor phases on the trays of tower 4 are typically low. Consequently, vapors leave the top of tower 4 through line 11 at a temperature higher than the solvent dew point, i.e. the vapors are superheated. This can result in a constraint in the capacity of the solvent recovery plant if the capacity of condenser 12 is inadequate, because of the liquid phase (contaminant) present in the overhead product. In addition, because the vapor is superheated, the overhead vapour leaving through line 11 will contain an unwanted proportion of distilled extract material which serves to contaminate the recovered solvent with extract and reduce the solvent's capacity to dissolve extract material when used in the treater tower of the solvent extraction plant. Furthermore, owing to low tray efficiencies of recovery tower 4, the liquid leaving the bottom-most tray of tower 4 contains a higher proportion of solvent than is desirable, and can result in overloading of the top-most trays of stripping tower 6. Finally, flooding of the top-most trays of tower 4 can occur if the delivery rate for the branched off extract solution introduced into the upper part of recovery tower 4 is too high, or if its temperature is substantially less than its bubble point temperature. If the branched off extract solution is too cold, a smaller proportion of the solvent in the branched off extract solution introduced into the recovery tower than desirable will be vaporized on the top tray, thus overloading and flooding the tray. As a result, liquid together with aromatic extract material therein may be entrained into overhead line 11. The liquid and aromatic extract in the resulting overhead foam contaminate the recovered solvent and reduce the capacity of the recovered solvent, as explained earlier.

Table 1 below sets out typical pressure and temperature conditions in the solvent recovery plant described above with reference to FIG. 1.

Figure 2:
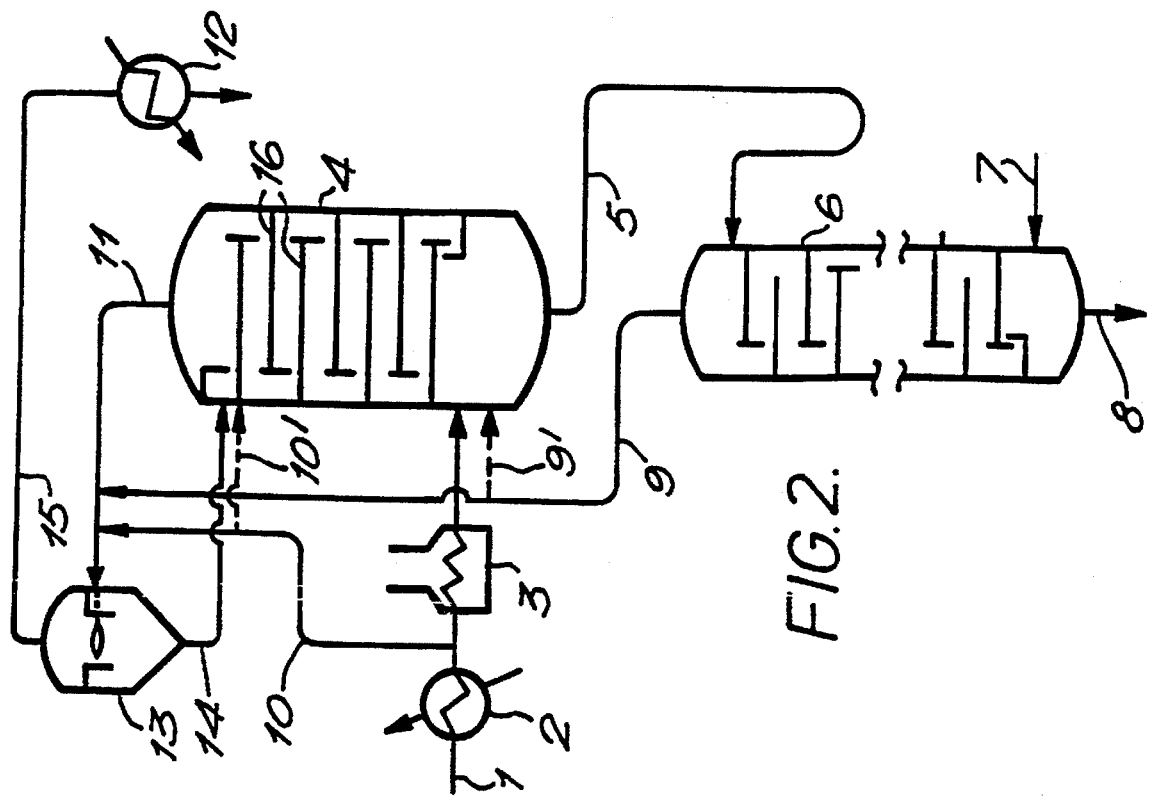
FIG. 2 is a schematic view of a preferred embodiment of the invention for recovering the solvent used in a lubricating oil extraction process, also indicating some possible modifications.

The embodiment of the invention shown in FIG. 2 is able to overcome these operational difficulties in a simple and effective manner. Many of the components of the solvent extraction plant depicted in FIG. 2 operate in essentially the same way as the corresponding components in FIG. 1. Such components are designated by the same reference numerals in FIG. 2 and will not be described in further detail herein. Table 1 also lists typical prevailing pressure and temperature conditions in the plant of FIG. 2. The significance of the temperature differences between the FIGS. 1 and 2 plants will be explained in the description, below, of the FIG. 2 embodiment.

TABLE 1

|  | FIG. 1 | FIG. 2 |
| --- | --- | --- |
| Extract solution feed temperature to pre-heater 3: | 150° C. | 150° C. |
| Extract solution feed temperature to tower 4: | 320° C. | 320° C. |
| Liquid bottoms product temperature (line 5): | 315° C. | 315° C. |
| Stripper bottoms product temperature (line 8): | 280° C. | 280° C. |
| Overhead product temperature from recovery tower: | 275° C. | 290° C. |
| Cyclone inlet temperature: | — | 265° C. |
| Cyclone vapour outlet temperature: | — | 265° C. |
| Cyclone liquid outlet temperature: | — | 265° C. |
| System pressure: | 3.5 Bar.g | 3.5 Bar.g |
| Strip gas: | $N_2$ | $N_2$ |

As shown in FIG. 2, the overhead product leaving rectification tower 4 through overhead line 11 is directed to an isothermal vapour-liquid separator, preferably comprising cyclone 13. For a recovery tower typically 12 feet (3.68 m) high, the cyclone would need to be about 2 to 3 feet (61.0 cm to 91.4 cm) in diameter. When the overhead product is a foamy stream owing to the presence of entrained liquid and aromatic extract material, the cyclone functions to collapse the foam, so as to separate the liquid phase-of, the overhead product from its vapor phase. Alternatively, other forms of isothermal separator than a cyclone can be used, such as a gravity settler using a large diameter vessel, an electrostatic precipitator, or a drum with suitably-placed demister pads or a crinkled wire mesh screen. The vapour phase passes along line 15 to condenser 12, in which the vapour condenses to (uncontaminated) liquid solvent, which can then be recycled to the solvent extraction plant. The separated liquid phase is returned to the recovery tower, along line 14, as liquid reflux. In the rectification tower, the small quantity of solvent in the liquid reflux can be recovered as overhead solvent vapour, and the remaining liquid phase can be separated out and included in the bottom product from the rectification tower.

Although the branched off liquid extract solution in branch line 10 can be introduced directly into the recovery tower 4 (as indicated by reference numeral 10') above the uppermost tray, to serve as the descending cooling flow in the tower, preferably, as indicated in FIG. 2, line 10 connects with the overhead line 11 leading from the recovery tower 4 to the cyclone 13. Because the temperature (e.g. 150° C.) of the extract solution in line 10 is below that (290° C.) of the overhead product coming from the recovery tower and because also the flow rate in overhead line 11 is sufficiently large (e.g. typically between 50 and 300 m/s) that the flow is turbulent (with Reynolds numbers typically between $10^7$ and $10^8$) so that thorough mixing of the branched off extract solution and the overhead product from the recovery tower is promoted in line 11, the temperature of the overhead product is reduced. This arrangement provides a very simple and effective means of alleviating the tendency towards flooding on the trays of tower 4, and thereby of increasing its capacity. This is because the intimate mixing of the streams fed to cyclone 13 ensures that the temperature of the vapour leaving the cyclone through line 15 (265° C.) is essentially equal to the dew point of the solvent. As such, any capacity limit of condenser 12 is alleviated, and the proportion of extract distilled into overhead line 11 and contaminating the recovered solvent is minimized or eliminated, because of operating at or close to the dew point of the solvent. The intimate mixing of the streams fed to cyclone 13 also ensures that the liquid leaving the cyclone through line 14 is essentially at its bubble point temperature. The use of this liquid as reflux to rectification tower 4, coupled with the bypassing of the recovery tower by the branched off extract solution in branch line 10, serves to alleviate the flooding constraints on the top trays of rectification tower 4 and of stripper tower 6, and to reduce the undesirable entrainment of liquid into overhead line 11.

As in the FIG. 1 embodiment, the vaporized solvent and strip gas passing together through the overhead line 9 from the stripper tower 6 can be introduced (through feedline 9') into the recovery tower adjacent the entry location of extract solution feedline 1. The operational benefits mentioned above, apart from the aforementioned adverse effect on the capacity limitation on tower 4, can be still be realised. However, preferably, as shown in FIG. 2, line 9 leads directly to and connects with overhead line 11. Then, the capacity limitation of the recovery tower and any tendency to tray flooding can be overcome too. Although, as indicated in Table 1, the temperature (315° C.) of the solvent vapor and strip gas in overhead line 9 exceeds that (290° C.) of the overhead product from the recovery tower 4, the mixture inlet temperature (255° C.) to the cyclone, and hence the cyclone vapor outlet temperature, can still be maintained at or close to the solvent dew point, because of the cooling effect of the extract solvent stream (temperature 150° C.) introduced into overhead line 11.

Also, fresh solvent may be used in place of or to supplement the extract solution added to cyclone 13 through branch line 10. The best choice of this liquid reflux will depend on economic considerations, but either source will provide satisfactory operation.

We claim:

1. Apparatus for recovering a first component of an extract solution from a solvent extraction process from at least one second component of the solution, said second component being less volatile than said first component, which apparatus comprises in combination:

a distillation tower for recovering a majority of the second component from the tower as a liquid bottoms product and for recovering the first component from the tower as an overhead product comprising gaseous phase of the first component and a residual amount of liquid phase oft he second component;

an isothermal separator; an overhead line from the tower to the isothermal separator to conduct said overhead product from the tower to the separator for separation therein of the residual amount of liquid phase in the overhead product;

a return line from the separator to the tower for returning the separated liquid from the separator to the tower as a liquid reflux therein;

a feed line for receiving the solution and for feeding a portion thereof to a lower region of the tower, and a heater in said feed line for preheating said portion so that a majority of it enters the tower in the vapor phase;

a branch line in the feed line, said branch line being located upstream of the heater and connecting the feed line to said overhead line between the tower and the separator, for feeding of a branched-off portion of the solution in the feed line to said overhead line to reduce the temperature of the overhead product therein substantially to the first component dew point.

2. Apparatus as claimed in claim 1, wherein said isothermal separator comprises a cyclone.

3. Apparatus as claimed in claim 1 or claim 2, further comprising a stripping tower having a feed line for feeding the liquid bottoms product from the distillation tower to the stripping tower, a gas stripping line for supplying strip gas to the stripping tower to strip residual amounts of the first component from the liquid bottoms product, and an overhead line from the stripping tower for feeding said residual amounts of the first component in vapor form, together with strip gas, to the overhead line from the distillation tower to the isothermal separator, so that the overhead product from the distillation tower, together with said residual amounts of the first component and strip gas from the stripping tower, are fed as a mixture in said overhead line to the isothermal separator.

4. A method for recovering in a distillation tower a first component of an extract solution from a solvent extraction process from at least one second component of the solution, said second component being less volatile than the first component, which process comprises the steps of:

(a) preheating a portion of the solution so as to vaporize a majority of said portion of the solution before it is introduced into the tower;

(b) feeding the preheated portion to the tower, in which the vapor ascends;

(c) contacting the hot ascending vapor with cooler descending liquid under conditions in the tower such that a majority of the second component is recovered as a liquid bottoms product and the first component is recovered overhead in an overhead product comprising gaseous phase of the first component and a residual mount of liquid phase of the second component;

(d) conducting another portion of the solution, before the solution is preheated, to a mixing location with the overhead product recovered in step (c), the temperature of the another portion of solution being below that of the overhead product so that the temperature of the overhead product after the liquid therein has been removed therefrom is essentially at the first component dew point;

(e) separating the residual mount of liquid phase of the second component from the gaseous phase of the first component in an isothermal separation process, so that substantially no liquid phase remains in the overhead product; and (f) retaining said separated residual liquid to the tower as reflux.

5. A method as claimed in claim 4, wherein residual quantities of the first component in the liquid bottoms product are removed by contact with ascending strip gas in a stripping tower and the removed residual quantities of the first component, together with strip gas, are mixed with the overhead product from the recovery tower containing the residual amount of liquid phase of the second component, the temperature of the overhead product after the liquid therein has been separated therefrom being substantially at the dew point of the first component.

* * * * *